(No Model.)
J. W. JACKSON.
HARROW.
No. 510,793. Patented Dec. 12, 1893.
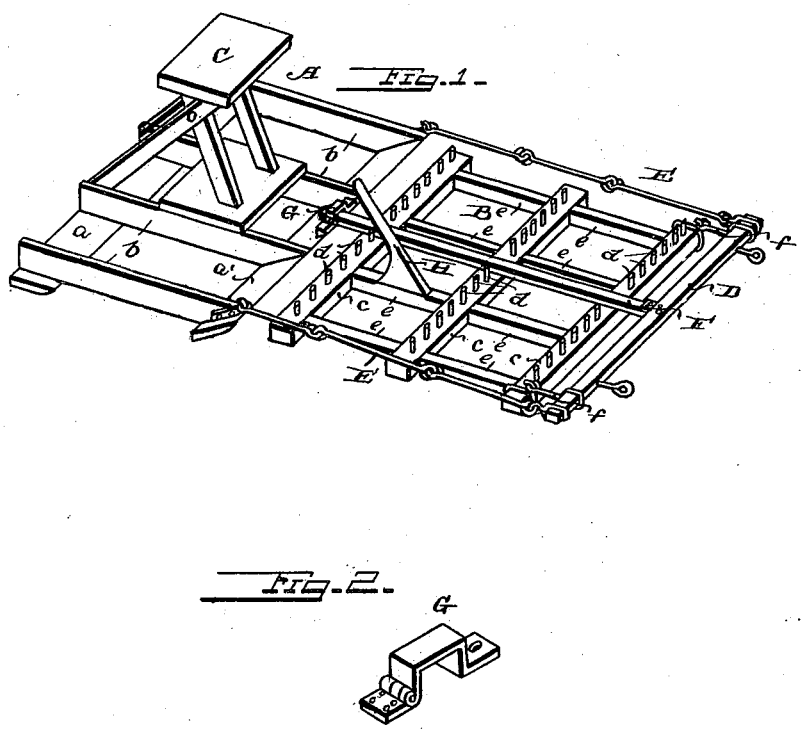
WITNESSES
Jesse Heller
Phil Masi
INVENTOR
J. W. Jackson,
by E. W. Anderson
his Attorney

UNITED STATES PATENT OFFICE.

JESSE W. JACKSON, OF JACKSONVILLE, ILLINOIS.

HARROW.

SPECIFICATION forming part of Letters Patent No. 510,793, dated December 12, 1893.
Application filed April 28, 1893. Serial No. 472,195. (No model.)

*To all whom it may concern:*

Be it known that I, JESSE W. JACKSON, a citizen of the United States, and a resident of Jacksonville, in the county of Morgan and State of Illinois, have invented certain new and useful Improvements in Harrows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of the invention and Fig. 2 is a detail view in perspective of the clevis.

This invention has relation to certain new and useful improvements in combined harrows and drags, and it consists in the novel construction and combination of parts, all as hereinafter described and pointed out in the claims.

Referring to the accompanying drawings, the letter A designates the drag, and B the harrow attached thereto. Said drag is shown as comprising the two leveling beams or boards $a, a'$ united by the longitudinal frame pieces $b$, upon which is supported a seat C. The harrow B is shown as comprising three transverse beams $c$ which carry the teeth $d$, and the connecting bars $e$. It will be understood however that I do not limit myself to the construction of the harrow and drag as above described, and as illustrated, as they may be of various forms, the invention relating more particularly to the means employed for connecting said drag and harrow, as will now be described.

D designates the transverse draft bar which is located just forward of the front beam $c$ of the harrow, and is connected to said beam by the hooks and links $f$, which render said draft bar capable of a swinging vertical movement. Connecting each end portion of said draft bar with the forward portion of the drag at each side is a jointed rod or link E, and connecting the central portion of said bar with the corresponding portion of the drag is a beam F, which is rigidly fastened to the draft bar, but is held to the drag by a clevis G. These connections it will be observed render the harrow and drag independent in their movements.

H is a lever used in cleaning the harrow, as follows:—When the harrow becomes foul or clogged, the clevis G is reversed or thrown back, which disconnects the beam F from the drag A. The harrow is then raised by means of the lever A to an angle of forty-five degrees, more or less, which permits any trash that has accumulated to escape, while in motion, and without interfering with the operation of the drag A.

By combining the drag and harrow, as herein described, it is claimed that better work can be done, in less time, and with less labor than when the drag and harrow are used separately, for the following reason:—The drag following the harrow comes in contact with the lumps and clods while they are fresh and more easily pulverized; and further, the necessity for going over the ground a second time after the lumps and clods become hardened, is avoided.

Having described this invention, what I claim, and desire to secure by Letters Patent, is—

1. The combination with a harrow B, and a transverse draft bar D, forward of said harrow, and having a flexible connection therewith, of the drag A to the rear of said harrow and having an independent frame, flexible connections between the lateral portions of said frame and the said draft bar, and a central beam F, rigidly connected at its forward end portion to said draft bar, and at its rear portion loosely held to the drag frame, substantially as specified.

2. In a combined drag and harrow, the combination with a drag, a harrow, and a draft bar loosely connected with the forward end of said harrow, of the links, one at each side and connecting said draft bar and drag, a central beam connected rigidly at its forward end to said draft bar, and at its rear end loosely held to the drag by a clevis, substantially as specified.

In testimony whereof I affix my signature in presence of two witnesses.

JESSE W. JACKSON.

Witnesses:
  JOSEPH FERRUREN,
  BAZZILL DAVENPORT.